C. B. Rogers,
Hanging Saws.

N° 45,677.　　　　　　Patented Dec. 27, 1864.

Witnesses.
R. F. Campbell
E. Schafer

Inventor.
C. B. Rogers
by his Atty.
Mason Fenwick & Lawrence

UNITED STATES PATENT OFFICE.

C. B. ROGERS, OF NORWICH, CONNECTICUT, ASSIGNOR TO C. B. ROGERS, & CO., OF SAME PLACE.

IMPROVEMENT IN MODES OF ADJUSTING CIRCULAR SAWS ON THEIR ARBORS.

Specification forming part of Letters Patent No. 45,677, dated December 27, 1864.

*To all whom it may concern:*

Be it known that I, C. B. ROGERS, of Norwich, county of New London, State of Connecticut, have invented an Improved Device for Adjusting Circular Saws Obliquely on their Arbors; and I do hereby declare that the following is a full, clear, and exact description thereof, reference being had to the accompanying drawings, making a part of this specification, in which—

Figure 1:
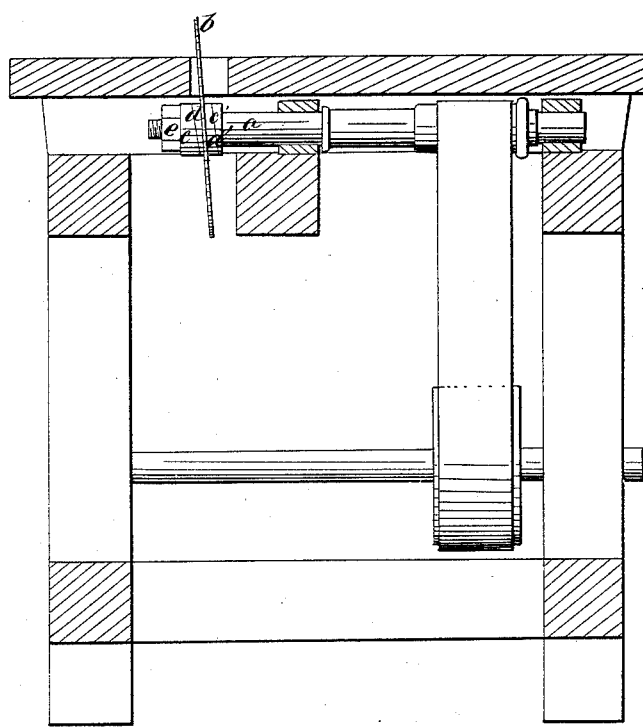
Figure 2:
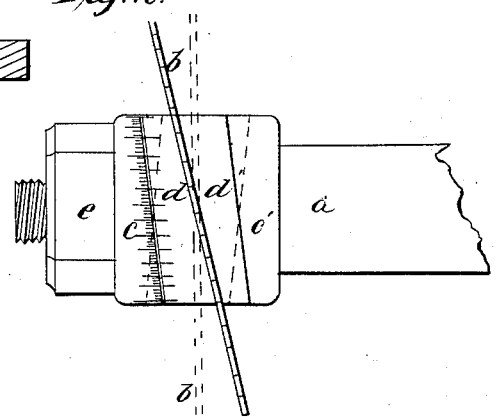
Figures 3, 4:
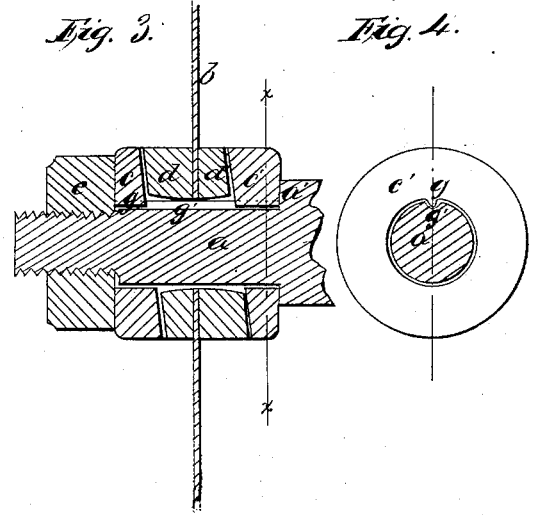
Figure 5:
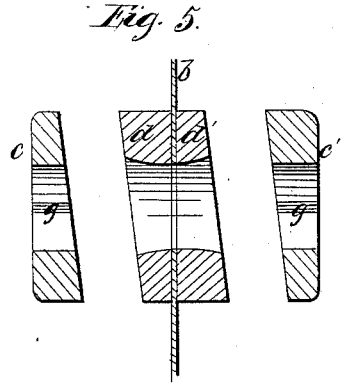

Figure 1 is a view of my improved device applied to a table, which is represented in section. Fig. 2 is an enlarged view of the improved device. Fig. 3 is a diametrical section through Fig. 2. Fig. 4 is a cross-section taken through Fig. 3 at the point indicated by red line $x\ x$. Figs. 5 are diametrical sections through the four adjusting-collars.

This invention relates to a new and improved device for adjusting circular saws obliquely on their arbors, for the purpose of producing grooves of different widths adapted for receiving tenons.

The object of my invention is to provide for giving any desired obliquity to a circular saw by the employment of beveled collars, which are so arranged that the adjustment can be made and registered by a simple movement of the saw, and without changing the collars or removing them from their arbor, as will be hereinafter described.

To enable others skilled in the art to make and use my invention, I will describe its construction and operation.

In the accompanying drawings, $a$ represents the arbor upon which the saw $b$ is secured, and $c\ c'\ d\ d'$ are collars which are slipped on the reduced end of the arbor $a$, and forced up against the shoulder $a'$ by means of a nut, $e$, as shown in Figs. 2 and 3. The two outside collars, $c\ c'$, are prevented from turning around the arbor $a$ by means of tenons $g$, which are formed on them, and which fit into a longitudinal groove, $g'$, in the arbor, as shown in Figs. 3 and 4. Any other plan may be adopted to prevent these two collars $c\ c'$ from turning loosely on the arbor. The two intermediate collars, $d$, $d'$, together with the saw $b$, are allowed to turn loosely on their arbor when they are not confined by the clamping-nut $e$. These two intermediate collars, $d\ d'$, are secured to the saw $b$—one on each side thereof—in any suitable manner which will cause them to turn when the saw is turned on its arbor. The impinging surfaces of the collars $c\ c'\ d\ d'$ are beveled so that they are oblique to the axis of the arbor. The two middle collars, $d\ d'$, are arranged with their beveled surfaces reversed and their outer faces, when they are secured to the saw, parallel to each other. When the saw is secured between these two collars and slipped on the arbor, it can be adjusted and set either in a plane at right angles to the axis of the arbor or at any desired angle deviating from said plane by simply loosening the nut $e$ and turning the saw (with its collars) upon its arbor, after which the nut $e$ is set up again and the collars $d\ d'$ and saw $b$ confined rigidly in place between the beveled surfaces of the two collars $c\ c'$.

It is very important to be able to determine to a certainty the degree of obliquity which is made by rotating or partially turning the saw on its arbor, so that this degree or angle will be registered on the collars, and thus the width of groove which will be cut indicated. To effect this object the angles which the saw will make in turning it on its shaft are indicated upon the circumference of the collars, as represented in Fig. 2, the marks denoting fractions of an inch. Each short mark on the fixed collar $c$ may indicate one-sixteenth or one-eighth difference in the width of groove, and if graduated properly these marks will register accurately as long as the size of the saw remains unchanged.

By my invention it is not necessary to adjust each one of the collars, as hitherto. The saw is moved the required distance, and this manipulation effects the adjustment.

Having thus described my invention, what I claim as new, and desire to secure by Letters Patent, is—

1. The combination of the key tenon and slot $g\ g'$ with the four collars $c\ c'\ d\ d'$, saw $b$, arbor $a$, and nut $e$, substantially in the manner and for the purpose described.

2. Producing the desired changes in the degree of obliquity of the saw, and at the same time registering and indicating the change, in the manner and by means substantially as described.

C. B. ROGERS.

Witnesses:
GEO. W. ROGERS,
RUFUS N. LADD.